United States Patent [19]
Fischerkeller

[11] Patent Number: 5,797,377
[45] Date of Patent: Aug. 25, 1998

[54] FUEL FEEDING DEVICE FOR MOTOR VEHICLES

[75] Inventor: Rolf Fischerkeller, Walheim, Germany

[73] Assignee: Robert Bosch GmbH, Stuttgart, Germany

[21] Appl. No.: 813,380

[22] Filed: Mar. 6, 1997

[30] Foreign Application Priority Data

May 8, 1996 [DE] Germany ............... 196 18 454.1

[51] Int. Cl.[6] .................................................. F02M 37/04
[52] U.S. Cl. ........................................ 123/514; 137/574
[58] Field of Search ............................ 123/514, 509; 137/574; 417/159, 195

[56] References Cited

U.S. PATENT DOCUMENTS

| | | | |
|---|---|---|---|
| 3,369,735 | 2/1968 | Hoffmeister | 417/195 |
| 4,397,333 | 8/1983 | Liba et al. | 137/574 |
| 4,503,885 | 3/1985 | Hall | 137/574 |
| 4,834,132 | 5/1989 | Sasaki et al. | 123/514 |
| 4,838,307 | 6/1989 | Sasaki et al. | 137/574 |
| 4,911,134 | 3/1990 | Olsson | 123/514 |
| 5,029,611 | 7/1991 | Sasaki | 137/574 |
| 5,078,169 | 1/1992 | Scheurenbrand et al. | 137/574 |
| 5,107,889 | 4/1992 | Sasaki et al. | 137/574 |
| 5,289,810 | 3/1994 | Bauer | 123/514 |

FOREIGN PATENT DOCUMENTS

3612194C1  10/1986  Germany .

*Primary Examiner*—Thomas N. Moulis
*Attorney, Agent, or Firm*—Michael J. Striker

[57] ABSTRACT

A fuel feeding device for a motor vehicle has a fuel container having a plurality of parts with bottoms separated from one another, a fuel feeding aggregate arranged to supply fuel from the fuel container to an internal combustion engine, a jet pump, the parts of the fuel container including a first part in which the fuel feeding aggregate is arranged and a second part in which the jet pump is arranged separately from the first part, a fuel return conduit and a suction conduit having a connection portion, the jet pump being formed in the connection portion, a nozzle arranged in the fuel return conduit, and a mixing tubular portion provided in the suction conduit and connected with the nozzle immediately downstream in a fuel feeding direction.

8 Claims, 2 Drawing Sheets

FUEL FEEDING DEVICE FOR MOTOR VEHICLES

The present invention relates to a fuel feeding device for motor vehicles.

Fuel feeding devices of this type are known in the art. One of such fuel feeding devices is disclosed for example in the German patent document DE 36 12 194 C1. This fuel feeding device for a motor vehicle has a fuel container in which a fuel retaining device is provided. The fuel retaining device serves for keeping ready a fuel quantity which is sufficient for the operation of the internal combustion engine. Fuel is supplied from the fuel retaining device through a fuel conduit with a fuel feeding aggregate to an internal combustion engine. For making available a continuously sufficient fuel quantity in the fuel retaining device, a jet pump arranged at the bottom side in the fuel container is provided outside of the fuel retaining device. This jet pump has an injector nozzle connected with a fuel return conduit and a funnel arranged at a distance and connected with a conduit inserted in the fuel retaining device. The jet pump is operated by the excessive fuel which is returned back, so that from the further part of the fuel container a fuel quantity is pumped into the fuel retaining device.

In such a fuel container which is subdivided into two or several parts which also can have separate bottoms, it is necessary to provide a jet pump in each part, so that the fuel in the fuel retaining device can be transferred into the part of the fuel container from which the fuel feeding aggregate takes the fuel for supplying the fuel to the internal combustion engine. Such a fuel feeding device has a construction which is complicated and cost intensive.

SUMMARY OF THE INVENTION

Accordingly, it is an object of the present invention to provide a fuel feeding device which avoids the disadvantages of the prior art.

In keeping with these objects and with others which will become apparent hereinafter, one feature of the present invention resides, briefly stated, in a fuel feeding device in which the jet pump is formed in a connecting portion between a fuel return conduit and a suction conduit, a nozzle is arranged in the fuel return conduit, and a mixing tubular portion provided in the suction conduit is connected directly downstream in the fuel feeding direction to the nozzle.

When the fuel feeding device is designed in accordance with the present invention, it has a simple and inexpensive arrangement, in which in a further part of the fuel container a connection portion between a fuel return conduit and a suction conduit is formed, in which connection portion a jet pump is integrated, and the suction conduit leads in a further part of the fuel container in which the fuel feeding aggregate is arranged.

In accordance with a further feature of the present invention, in the connecting portion the fuel return conduit and the suction conduit are connected with one another in a force-transmitting and/or form-locking manner. Thereby a simple and cost-favorable coupling of both conduits is possible. For example, the suction conduit can be fitted onto the fuel return conduit and arranged under pressure relative to the fuel return conduit. Thereby further components, such as for example hose shells and the like are dispensed with. This makes possible a simple and fast as well as inexpensive mounting.

In accordance with a further advantageous feature of the present invention, the nozzle insertable in the fuel return conduit has an outer diameter which is increased relative to the inner diameter of the fuel return conduit. Thereby a surrounding bead is formed near the free end of the fuel return conduit, and a pulling-off securing feature or a secure mounting of the suction conduit fitted on the fuel return conduit can be provided.

In accordance with still a further feature of present invention, the suction conduit has a recess arranged at a distance from the free end of the suction conduit. Thereby it is guaranteed that a sufficiently great overlapping region is formed between the fuel return conduit and the suction conduit, so that the recess is arranged downstream of the nozzle without narrowing the cross-section of the recess by the fuel return conduit.

In accordance with still a further feature of present invention, the nozzle is formed as an insert composed of synthetic plastic material and insertable in the fuel return conduit. Thereby a cost favorable manufacture of the nozzle is provided. Since the nozzle is formed as an insert, a jet pump is provided which is composed of a minimal number of components. Thereby during the mounting as well as in the manufacture, a substantial saving of cost and time can be obtained.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
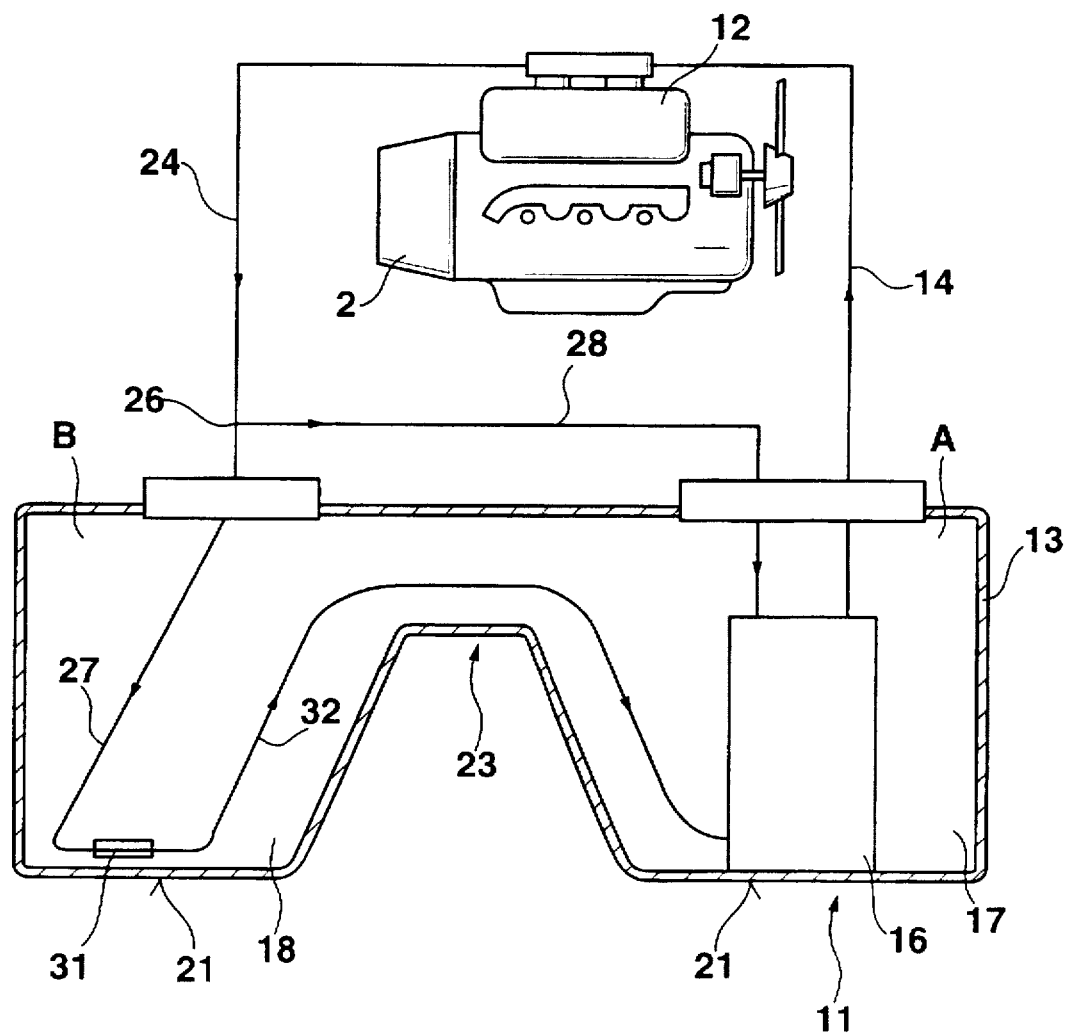
FIG. 1 is a view showing a fuel feeding device of a motor vehicle for supplying an internal combustion engine with fuel from a fuel container.

FIG. 1 shows in a simplified manner a fuel feeding device which is identified with reference numeral 1 and utilized to supply an internal combustion engine 12 of a motor vehicle with fuel. Fuel is supplied from a fuel container 13 through a fuel feeding conduit 14 in which a fuel feeding aggregate 16 is arranged, to the internal combustion engine 12. The fuel feeding aggregate 16 can be formed in any manner.

The fuel container 13 is rugged and has for example two parts 17 and 18. Their bottoms 21 and 22 are separated from one another by a raised hump or saddle 23. Such a fuel container is inserted for example in the motor vehicles with the rear wheel drive or fourwheel drive. At least one drive shaft is arranged between the parts 17 and 18 of the fuel container 13. Furthermore, such saddle fuel containers are preferably mounted in motor vehicles with a low space available. The fuel container 13 can also have several parts or tank halves with the bottoms 21, 22 separated from one another by the raised hump or saddle 23.

The excessive quantity of the fuel supply to the internal combustion engine 12 through the fuel conduit 14 is returned through a fuel return conduit 24 to the fuel container 13. The fuel return conduit 24 has a branch 26. A partial quantity of the returned fuel is supplied through the fuel return conduit 27 into the part 18 of the fuel container 13 and through the fuel return conduit 28 into the part 17 of the fuel container 13 in which the fuel feeding aggregate 16 is arranged, or is directly supplied to the fuel feeding aggregate 16.

A jet pump 31 is arranged on the part 18 of the fuel container 13 and operated by the returned excessive fuel. Through a suction conduit 32 it supplies the fuel into the part 17 of the fuel container 13 to the fuel feeding aggregate 16. The fuel feeding aggregate 16 can aspirate from a retaining container arranged in the part 17 of the fuel container 13. The suction conduit 32 can open into the retaining container or in the part 17 of the fuel container 13 outside the retaining container. The fuel jet 31 is arranged near the bottom 22 of the fuel container 13, so that even with a low fuel level, fuel can be supplied from the part 18 of the fuel container 13 to the fuel feeding aggregate 16.

Figure 2:
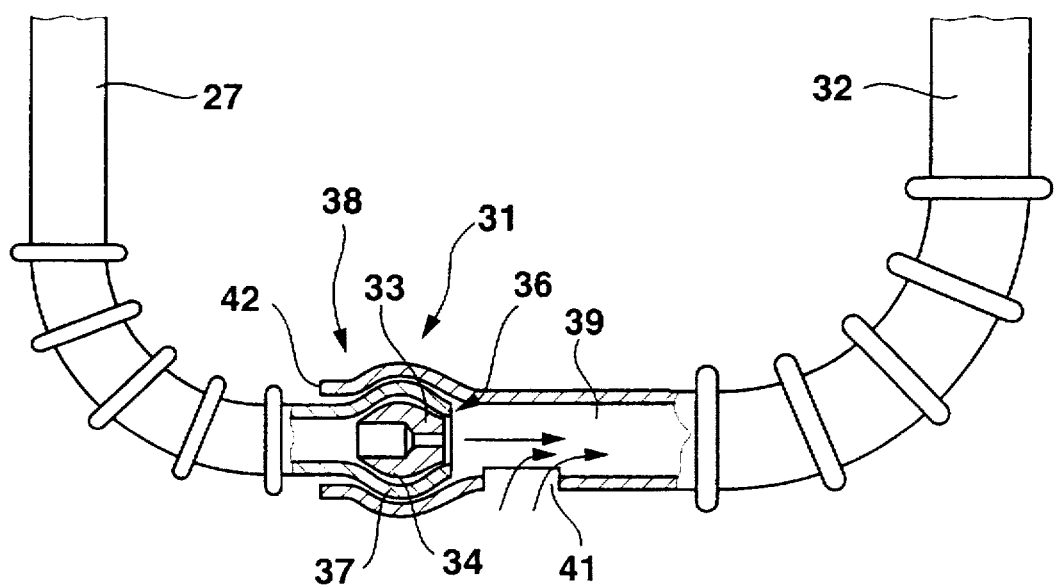
FIG. 2 is a view schematically showing a cross-section of a jet pump of the inventive fuel feeding device.

FIG. 2 shows a schematic section of the jet pump 31 in accordance with the present invention. The jet pump 31 has a nozzle 33 which is inserted in the fuel return conduit 27. The nozzle 33 is preferably formed of synthetic plastic injection molded part. It has a convex outer diameter 34 as seen in the cross-section, which is greater than an inner diameter of the fuel return conduit 27. Alternatively, the nozzles 33 can be provided on its outer periphery with several barb-shaped projections, so that a so-called pinetree profile is obtained. Thereby immediately near a free end 36 downstream of the fuel feeding aggregate, a bead-shaped portion 37 of the fuel return conduit 27 is formed. This has the advantage that on the one hand the nozzle 33 is reliably arrangeable in the end region of the fuel return conduit 27. Furthermore, a securing from loosening of the suction conduit 32 is provided, which is fitted on the fuel return conduit 27. By the insertion of the nozzle 33 into the return conduit 27, it is expanded and due to the expansion of the material of the return conduit 27, the nozzle 33 is held. The suction conduit 32 can be mounted in a simple manner on the return conduit 27.

The fuel return conduit 27 and the suction conduit 32 form a connection portion 38 in the region of the bead-shaped portion 37. The fuel conduit 27 and the suction conduit 32 are arranged in the connection portions 38 in an overlapping manner. The suction conduit 32 is arranged in a force-transmitting and/or form-locking manner relative to the fuel return conduit 27. Thereby it is not necessary to use further mounting means.

A mixing tubular portion 39 is integrated in the suction conduit 32. It is connected directly to the nozzle 33. For this purpose the suction conduit 32 has a recess 41, whereby a connection to the part 18 of the fuel container 13 is provided. With the nozzle inserted in the fuel return conduit 27, a suction effect in the recess 41 is obtained. Thereby fuel is supplied through the recess 41 from the part 18 of the fuel container 13 into the suction conduit 32. The recess 41 is arranged at a distance from a free end 42 of the suction conduit 32. The distance is formed by the overlapping region which is needed for the connection portion 38. Thereby it is guaranteed that the fuel return conduit 27 does not reduce the cross-section of the recess 41.

The fuel return conduit 27 and the suction conduit 32 are formed as flexible pipes, for example corrugated pipes. They also can be formed as pre-bent pipes. Alternatively, the conduits 27, 32 can also be formed as rubber hoses.

In accordance with an alternative embodiment, it can be provided that the nozzle 33 is inserted at the end side of the free end 36 of the fuel return conduit 27 and has a circumferential bead, so that a force-transmitting and/or form-locking connection between the nozzle 33 and the fuel return conduit 27 is formed. The suction conduit 32, analogously to FIG. 2 can be fitted also over the nozzle 33 and subsequently over the fuel return conduit 27 and form a form-locking and/or force-transmitting connection with the fuel return conduit 27.

Furthermore, an alternative can be provided in that the free end 42 of the suction conduit 32 can be arrangeable between the nozzle 33 and the fuel return conduit 27 and thereby form a force-transmitting and/or form-locking connection portion 38.

The jet pump 31 shown in FIG. 2 is formed simply and inexpensively. A mixing tubular portion 39 is integrated in the suction conduit 32 and the supplied excessive fuel is returned in a simple manner to the feeding aggregate 16. A further fuel quantity can be transported from the part 18 of the fuel container 13 to the fuel feeding aggregate 16.

It will be understood that each of the elements described above, or two or more together, may also find a useful application in other types of constructions differing from the types described above.

While the invention has been illustrated and described as embodied in fuel feeding device for motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A fuel feeding device for a motor vehicle, comprising a fuel container having a plurality of parts with bottoms separated from one another; a fuel feeding aggregate arranged to supply fuel from said fuel container to an internal combustion engine; a jet pump, said parts of said fuel container including a first part in which said fuel feeding aggregate is arranged and a second part in which said jet pump is arranged separately from said first part; a fuel return conduit and a suction conduit having a connection portion, said jet pump being formed in said connection portion; a nozzle arranged in said fuel return conduit; and a mixing tubular portion provided in said suction conduit and connected with said nozzle immediately downstream in a fuel feeding direction, said nozzle being inserted directly into an end of said fuel return conduit, and said end of said fluid return conduit together with said nozzle inserted in it being inserted into an end of said suction conduit.

2. A fuel feeding device as defined in claim 1, wherein said fuel return conduit and said suction conduit are connected with one another in said connection portion in a force-transmitting manner.

3. A fuel feeding device as defined in claim 1, wherein said fuel return conduit and said suction conduit are connected with one another in said connection portion in a form-locking manner.

4. A fuel feeding device as defined in claim 1, wherein said fuel return conduit and said suction conduit are connected with one another in said connection portion in a force-transmitting and form-locking manner.

5. A fuel feeding device as defined in claim 1, wherein said fuel return conduit has an inner diameter, said nozzle having an outer diameter which is greater than said inner diameter of said fuel return conduit.

6. A fuel feeding device as defined in claim 1, wherein said suction conduit has a free end and is provided with a recess which is spaced from said free end.

7. A fuel feeding device as defined in claim 6, wherein said connection portion of said fuel return conduit and said suction conduit has a size, said recess having a size corresponding to at least said size of said connecting portion.

8. A fuel feeding device as defined in claim 1, wherein said nozzle is composed of synthetic plastic material and inserted in said fuel return conduit as an insert.

* * * * *